United States Patent [19]

Onagi

[11] Patent Number: 5,448,552
[45] Date of Patent: Sep. 5, 1995

[54] SUPER RESOLUTION INFORMATION REPRODUCTION BY TRACKING ADDRESS INFORMATION IN NORMAL RESOLUTION

[75] Inventor: Nobuaki Onagi, Tsurugashima, Japan

[73] Assignee: Pioneer Electronic Corporation, Tokyo, Japan

[21] Appl. No.: 126,515

[22] Filed: Sep. 24, 1993

[30] Foreign Application Priority Data

Sep. 29, 1992 [JP] Japan .................... 4-259961

[51] Int. Cl.⁶ .................. G11B 11/10; G11B 13/04; G11B 7/24
[52] U.S. Cl. .................. 369/275.4; 369/13; 369/275.3; 360/59
[58] Field of Search ............ 369/13, 110, 112, 275.4, 369/275.3, 275.1; 360/59, 114; 359/368, 558, 894; 364/525, 576

[56] References Cited

U.S. PATENT DOCUMENTS

| | | | |
|---|---|---|---|
| 4,164,788 | 8/1979 | Jain | 364/515 |
| 4,917,462 | 4/1990 | Lewis et al. | 359/368 |
| 5,121,378 | 6/1992 | Hirose et al. | 369/112 |
| 5,199,022 | 3/1993 | Suzuki et al. | 369/13 |
| 5,371,722 | 12/1994 | Yoshimura et al. | 369/13 |
| 5,383,176 | 1/1995 | Inui et al. | 369/275.1 |

OTHER PUBLICATIONS

"Super Resolution in a magneto-optical disk with an active mask", in Japanese Applied Magnetic Academy's paper, Atsushi Fukomoto, vol. 15, No. 5, 1991.

*Primary Examiner*—Scott J. Sugarman
*Assistant Examiner*—Kim-Kwok Chu
*Attorney, Agent, or Firm*—Kane, Dalsimer, Sullivan, Kurucz, Levy, Eisele and Richard

[57] ABSTRACT

An optical disk includes: a substrate shaped in a disk, and having a recording surface; a plurality of recording tracks formed substantially coaxially on the recording surface; a plurality of information pits, which are reproducible by a super resolution reproduction, recorded on the plurality of recording tracks in a recording operation of the optical disk; and an address pit for address reproduction formed in advance to the recording operation on the recording surface with respect to one set of recording tracks adjacent to each other in a radial direction of the optical disk.

10 Claims, 8 Drawing Sheets

A-A'   B-B'   C-C'

F-F'   H-H'   I-I'

SUPER RESOLUTION INFORMATION REPRODUCTION BY TRACKING ADDRESS INFORMATION IN NORMAL RESOLUTION

BACKGROUND OF THE INVENTION

1. Field of the Invention

The present invention is related with an optical disk, an optical disk reproducing apparatus, and an optical disk recording apparatus, and more specifically, it is related with the optical disk and the optical disk reproducing apparatus, in which a high density record is possible.

2. Description of the Related Art

FIG. 1 shows a constitution of an information recording surface of a magneto-optical disk.

In the magneto-optical disk, grooves G, which are approximately coaxially arranged guiding grooves, are formed, and lands L are formed along with the grooves G. Information pits (record marks) are normally formed on the lands L. In order to read out the information pit without error, the groove G is kept in such a state that nothing is recorded thereon.

If the information pit is formed on both of the land L and the groove G with respect to the magneto-optical disk, a crosstalk is generated so that there arises a problem that the information pit cannot be correctly read.

In order to solve the above-mentioned problem, there is a super resolution reproduction, such as a MSR (Magnetically induced Super Resolution).

The super resolution is such a technology, which is developed in the field of a microscope, that a high resolution exceeding a usual definition is obtained by a special process applied to the image formation system, or by the post process applied to the image. For example, there is one method of dividing a spacial frequency domain into some pieces, performing the image formation in each domain, and synthesizing them on the image formation plane. There is another method of performing an image formation after modulating the object image by use of a lattice, and demodulating it on the image formation plane.

Hereinbelow, the MSR as one technique of the super resolution reproduction, will be explained. In the technical field of the microscope, it is known that the image resolution can be improved by preparing an optical mask like a pinhole at an objective position. In the MSR, a physical mask is not prepared at the recording medium surface of the magneto-optical disk, but a mask is formed in efficiency in the medium by use of the temperature distribution in the medium. The MSR enlarges the spacial frequency of the reproduction limit in efficiency, whereby to improve the recording density to about 1.5 to 3 times (see in detail "Atsushi Fukomoto, super resolution in a magneto optical disk with an active mask" in Japanese Applied Magnetic Academy's paper, Vol.15, No.5.1991, etc.).

However, in the above-mentioned MSR, in order to perform the super resolution reproduction, it becomes necessary to magnetically record the information pit, or the address pit for address generation.

Therefore, with respect to the optical disk, on which the address pit is recorded in advance as a phase pit in the same manner as the information pit of a ROM disk etc., the above-mentioned super resolution reproduction cannot be applied to the reproduction of the address pit. Thus, the address pit needs to be formed in such a large size that allows a normal reproduction (normal resolution reproduction). Even if the information pits are formed on both of the land L and the groove G in order to improve the recording density, it is not possible to make the address pit correspond to both of the land L and the groove G by one to one, resulting in a problem that a perfect information reproduction cannot be performed.

SUMMARY OF THE INVENTION

It is therefore an object of the present invention to provide an optical disk and an optical disk reproducing apparatus, which are not influenced by the crosstalk etc., even if there are intermingled the information pits, which are reproducible by the super resolution reproduction, and the address pits, which are only reproducible by the normal reproduction, so as to reproduce the record data perfectly.

According to the present invention, the above object can be achieved by a first optical disk including: a substrate shaped in a disk, and having a recording surface; a plurality of recording tracks formed substantially coaxially on the recording surface; a plurality of information pits, which are reproducible by a super resolution reproduction, recorded on the plurality of recording tracks in a recording operation of the optical disk; and an address pit for address reproduction formed in advance to the recording operation on the recording surface with respect to one set of recording tracks adjacent to each other in a radial direction of the optical disk.

In the first optical disk, the information pits, which can be reproduced by the super resolution reproduction, are recorded on a plurality of recording tracks. One address pit for address reproduction is formed with respect to one set of the record tracks adjacent to each other in the radial direction of the optical disk. Consequently, it is possible to improve the information recording density, and at the same time, it is possible to perform the recording in which the recording density is improved, even in such a case that the size of the address pit is not small but is large as compared with the information pit.

According to the present invention, the above object can be also achieved by a second optical disk including: a substrate shaped in a disk, and having a recording surface; a recording track including a plurality of lands and a plurality of grooves, and formed substantially coaxially on the recording surface; a plurality of information pits, which are reproducible by a super resolution reproduction, recorded on both of the land and the groove in a recording operation of the optical disk; and an address pit for address reproduction formed in advance to the recording operation on the recording surface with respect to one set of the land and the groove adjacent to each other in a radial direction of the optical disk.

In the second optical disk, the information pits, which can be reproduced by the super resolution reproduction, are recorded on both of the land and the groove. One address pit for address reproduction is formed with respect to one set of the land and the groove adjacent to each other in the radial direction of the optical disk, whereby to improve the information recording density, and it becomes possible to perform a recording in which the recording density is improved even in such a case that the size of the address pit is not small but is rather large.

According to the present invention, the above object can be also achieved by an optical disk reproducing apparatus for reproducing the above mentioned second optical disk of the present invention. The optical disk reproducing apparatus is provided with: an optical pickup for irradiating a read beam onto the optical disk and reading information recorded on the optical disk; a first driving device for searching the address pit corresponding to a desired land or groove and for driving the read beam to a recording position of the address pit when reproducing the information pit on the desired land or groove; and a second driving device for driving the read beam to the desired land or groove from the recording position of the address pit.

In the optical disk reproducing apparatus of the present invention, when the first driving device reproduces the information on the desired land or groove, the first driving device searches the address pit corresponding to the desired land or groove, and drives the read beam to this address pit recording position. After that, the second driving device drives the read beam from the recording position of this address pit to the desired land or groove. Therefore, just by recording one address pit with respect to one set of the land and the groove, the information of the desired land or the desired groove can be reproduced.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.
First Embodiment FIG. 2 shows a constitution of an optical disk of the first embodiment.

Figure 1:
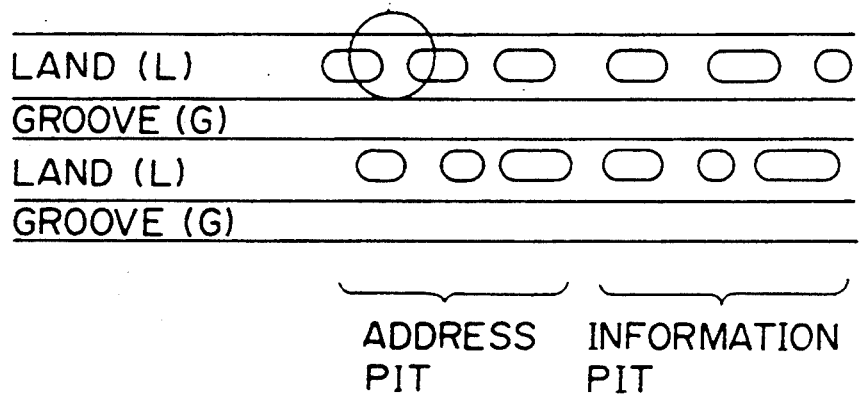
FIG. 1, is a diagram for explaining a constitution of an optical disk in the related art.
Figure 2A:
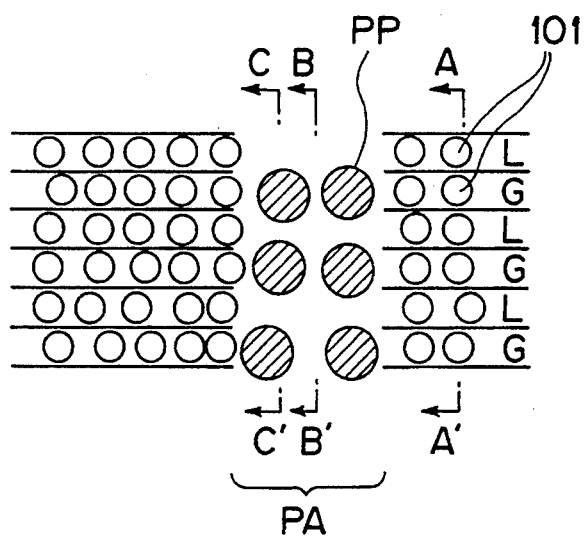
FIG. 2, which consist of FIGS. 2A to 2D, are diagrams for explaining a constitution of an optical disk of a first embodiment.
Figures 2B, 2C, 2D:
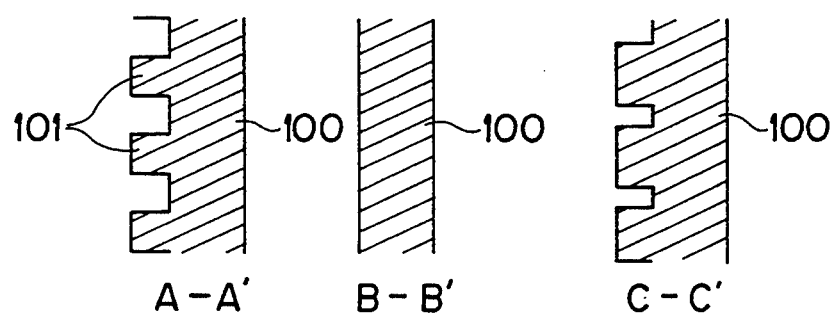

As shown in FIG. 2A, a plurality of lands L and a plurality of grooves G, are prepared on a recording surface of a substrate of a magneto-optical disk. As shown in FIG. 2B, the A–A' cross section of the magneto-optical disk is made in a concavo-convex state on the substrate 100.

A prepit PP (i.e. a phase pit, which is indicated by a slashed circle mark in FIG. 2A) for address generation, is formed on the axis of the groove G of the magneto-optical disk. In the present embodiment, an area PA (i.e. prepit area) where the prepits PP are formed, consists of a mirror finished surface as shown in FIG. 2C (the B–B' cross section).

The length of the prepit PP in the direction of the normal line, is generally formed longer than an information pit 101 (which is indicated by a circle mark in FIG. 2A) on the substrate 100. The width of the prepit PP in the radial direction, is almost equal to or larger than the width of the groove G as shown in FIGS. 2A and 2D.

Here, the information pit 101 is reproducible by a super resolution reproduction such as the aforementioned MSR. For example, the information pit 101 may be constructed to be detected by the FAD (Front Aperture Detection) of the MSR, in which the high temperature zone in the information pit heated by the read beam becomes the mask of the information pit while the not-heated front portion of the read beam becomes the aperture. Alternatively, the information pit 101 may be constructed to be detected by the RAD (Rear Aperture Detection) of the MSR, in which the high temperature zone in the information pit heated by the read beam becomes the aperture while the not-heated rear portion of the read beam becomes the mask. Further, the information pit 101 may be constructed to be detected by another super resolution reproduction technique, in which the reproduction film composing the information pit is magnetized inwardly by heating the film by the read beam, to enable the super resolution. Various known super resolution reproduction techniques can be employed to the information pit 101 of the present.

Figure 3:
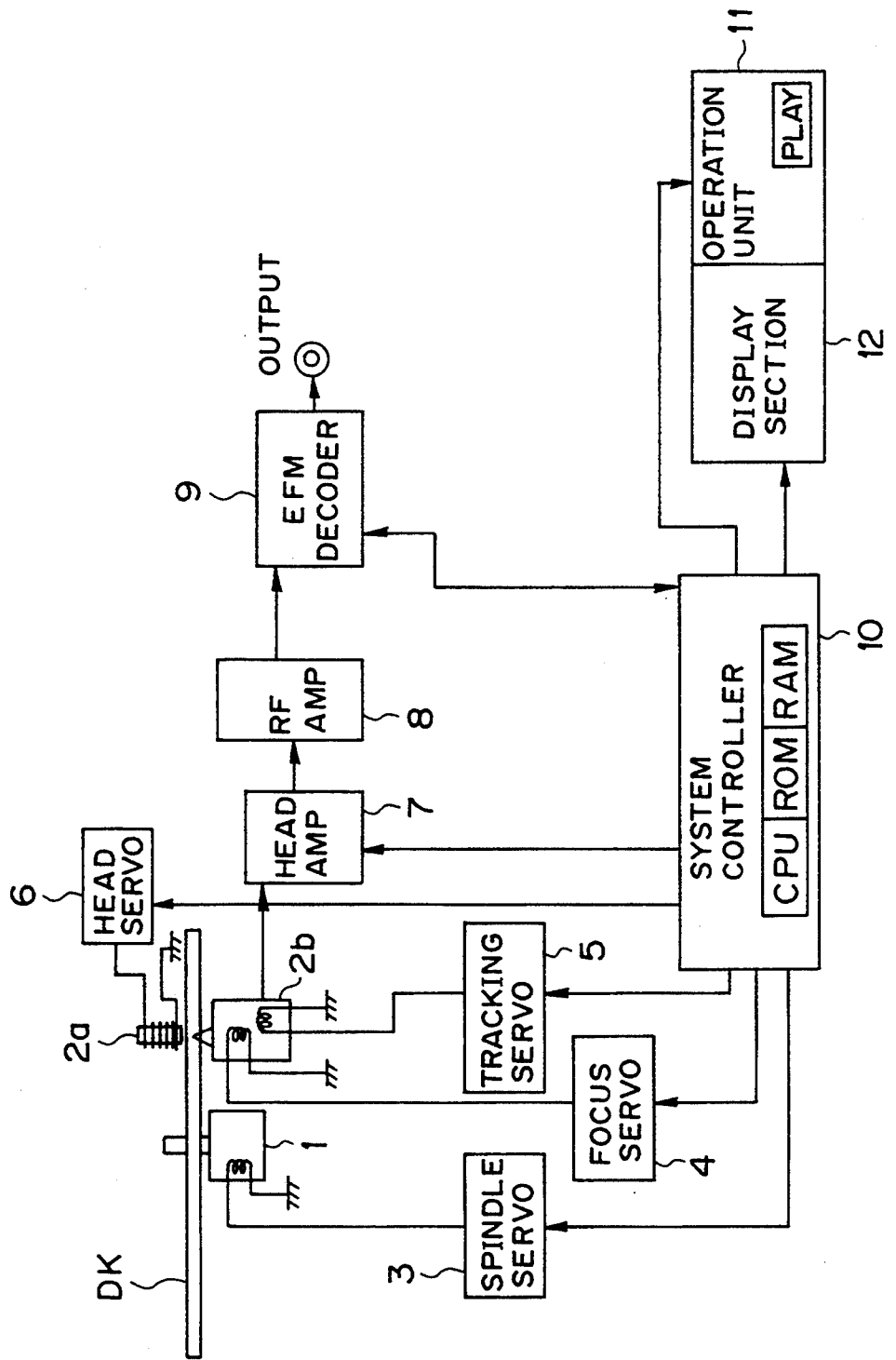
FIG. 3 is a block diagram which indicates an outline constitution of a magneto-optical disk reproducing apparatus of the first embodiment.

FIG. 3 is a block diagram indicating an outline constitution of a magneto-optical disk recording and reproducing apparatus.

In FIG. 3, the magneto-optical disk recording and reproducing apparatus is provided with a spindle motor 1, a magnetic head 2a, and an optical pickup 2b. The spindle motor 1 rotationally drives a magneto-optical disk DK. The optical pickup 2b is interlocked with the magnetic head 2a, and is moved in the radial direction of the magneto-optical disk DK by an actuator. The optical pickup 2b includes a laser light source, a lens, a photodetector, and so on.

The magneto-optical disk recording and reproducing apparatus is adapted to irradiate a laser light spot to the magneto-optical disk DK at the time of recording and reproducing the data, and detect the strength of the reflected light at the time of reproducing the data. The reflected light is generated such that the polarization plane thereof is slightly rotated on the magneto-optical disk DK, to which the light spot is irradiated, by the magnetic Kerr effect. The magneto-optical disk recording and reproducing apparatus is also adapted to output RF (Radio Frequency) signal, which is obtained by photo-electrically converting the strength of the reflected light.

The magneto-optical disk recording and reproducing apparatus is provided with a spindle-servo circuit 3, a focus-servo circuit 4, a tracking-servo circuit 5, a head-servo circuit 6, a head amplifier 7, an RF amplifier 8, an EFM decoder 9, a system controller 10, an operation unit 11, and a display section 12.

The spindle-servo circuit 3 controls the spindle motor 1. The focus-servo circuit 4 controls the focus of the optical spot irradiated to the magneto-optical disk DK from the optical pickup 2b. The tracking-servo circuit 5 controls the movements of the track positions of the magnetic-head 2a and the optical pickup 2b. The head-servo circuit 6 controls the magnetic head 2a. The head amplifier 7 amplifies the output signal of the optical pickup 2b. The RF amplifier 8 generates a reproduction signal from the output of the head amplifier 7, and generates various control signals. The EFM decoder 9 restores the EFM signal, which is outputted from the RF amplifier 8 at the time of data reproduction, and outputs digital output data. The system controller 10 controls the whole apparatus at the time of data reproduction. Operation inputs for data reproduction, are inputted through the operation unit 11. The operation unit 11 includes operation switches, such as a reproduction switch ("PLAY" switch). The display section 12 performs various displays at the time of data reproduction.

Nextly, the operation of the present embodiment will be explained with reference to the flow chart of FIG. 4.

Figure 5:
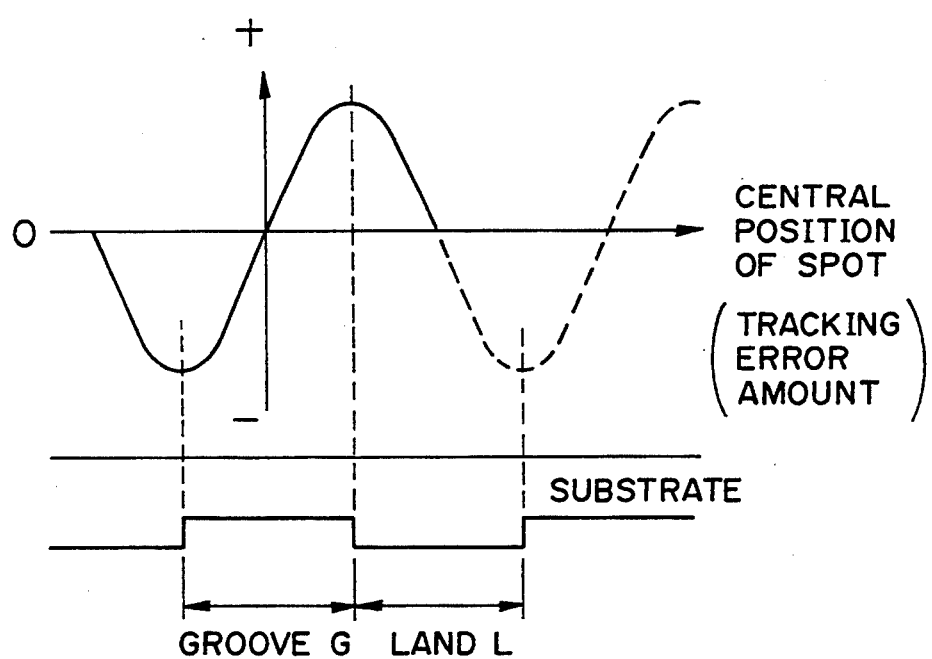
FIG. 5 is a diagram showing a tracking error signal in the first embodiment.

In the following explanation, it is assumed that, whether the position to reproduce/record the information pit is on the land L or the groove G, is indicated by a least significant bit (LSB) of the address data. More concretely, it is assumed that the basic address data, for specifying one set of the land and the groove, including the land L which information pit is to be reproduced or recorded, is equal to "0100", and that the bit information indicating the land L is X (X:0 or 1). At this time, the address data becomes equal to "0100 X". In this case, the basic address data of the target, is recorded on the groove G. At the inner and outer circumferential sides of the groove G, there exists the land L. Thus, it becomes necessary to determine in advance whether the land corresponding to the basic address data is the inner circumferential side or the outer circumferential side. When the groove indicated by the basic address data is detected, it becomes possible to immediately perform jumping to a right land, by monitoring whether the tracking error signal is deflected to the plus (+) side or to the minus (−) side, as shown in FIG. 5.

Figure 4:
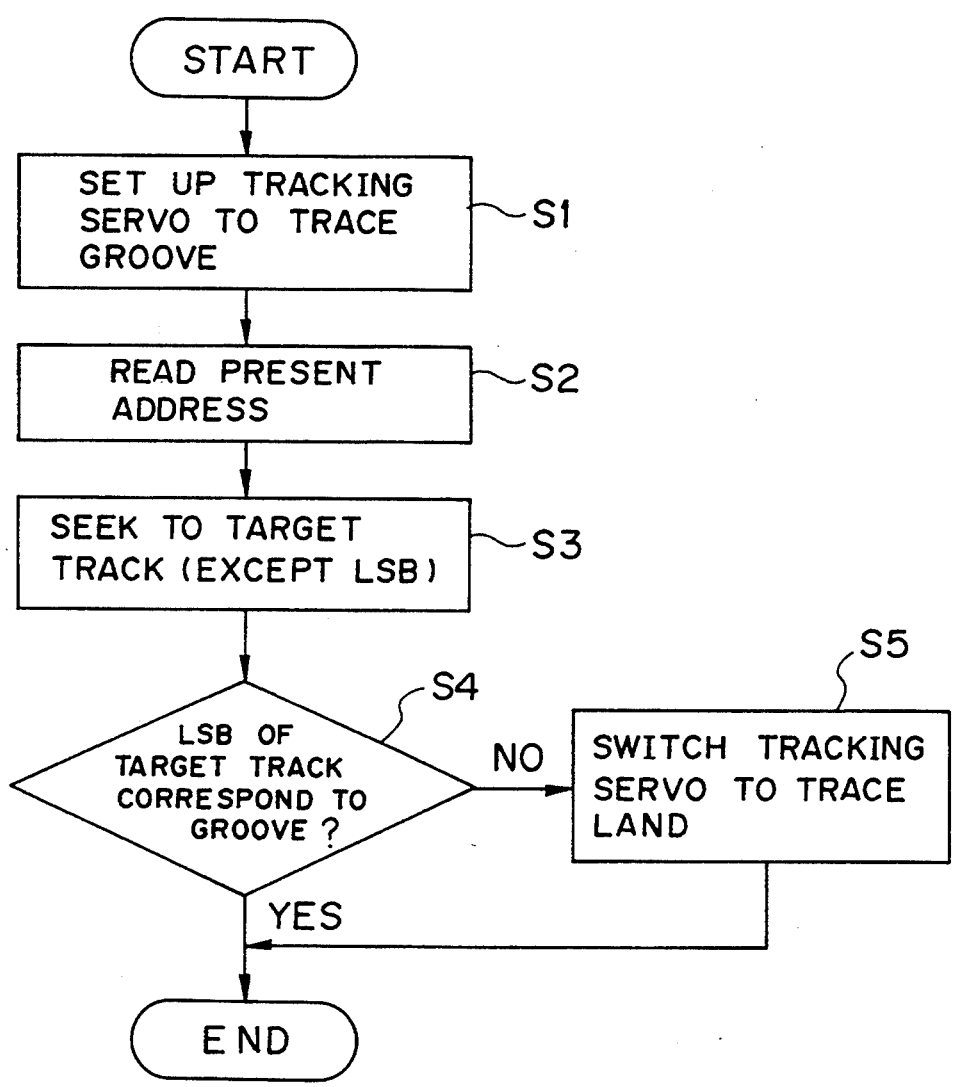
FIG. 4 is a flow chart in the operation of the first embodiment.

In FIG. 4, firstly, the system controller 10 controls the tracking-servo circuit 5 to set up so as to trace the groove (step S1).

Next, the system controller 10 reads the present address data (basic address data) obtained through the pickup 2b, the head amplifier 7, the RF amplifier 8, and the EFM decoder 13 by irradiating the light spot to the prepit (step S2). And, the system controller 10 compares thus obtained data with the portion of the target address data except the least significant bit thereof, and seeks to the target track (i.e. to one set of the land and the groove) (step S3).

When it reaches to the target track, the system controller 10 judges the least significant bit (=X) of the address data, and judges whether the final target address data corresponds to the groove or not (step S4).

If the final target address corresponds to the groove G, it is concluded that the seeking operation is already completed, so that the seeking process is ended, since in the present embodiment, the basic address data is recorded on the groove G.

Moreover, if the final target address corresponds to the land, the system controller 10 controls the tracking-servo circuit 5 to switch the tracking servo-control so as to trace the land L and draw it into the land L, and ends the seeking process (step S5).

After that, the super resolution reproduction operation of the information pits, which are recorded on the groove G or the land L, is performed under the control of the system controller 10.

As described above, even in the case that there are intermingled the information pits, which are reproducible by the super resolution reproduction, and the address pits, which are only reproducible by the normal reproduction, the reproduction is not influenced by the crosstalk etc., the record data can be perfectly reproduced, and the recording density of the magneto-optical disk can be also improved, according to the present embodiment.

Second Embodiment

FIG. 6 shows an optical disk of the second embodiment. In this second embodiment, the prepits are prepared in the land.

Figure 6A:
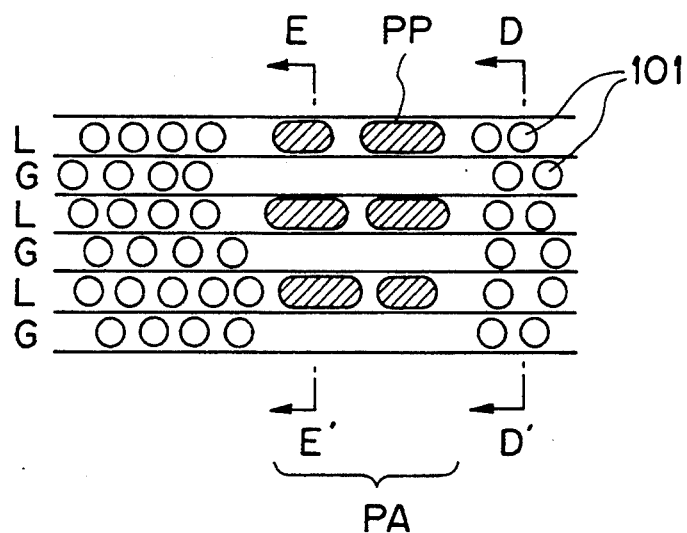
FIG. 6, which consist of FIGS. 6A to 6C, are diagrams for explaining a constitution of an optical disk of a second embodiment.

As shown in FIG. 6A, a plurality of lands L and a plurality of grooves G are prepared on a recording surface of a substrate of the magneto-optical disk. As shown in FIG. 6 B, the D-D' cross section is made in the concavo-convex state on a substrate 100.

The prepits PP (i.e. the phase pits) for address generation are formed on the axis of each land L of the magneto-optical disk. In the present embodiment, the groove G is also formed on this area PA (i.e. prepit area), in which the prepits PP are formed, in parallel to the land as shown in FIG. 6A.

Figures 6B, 6C:
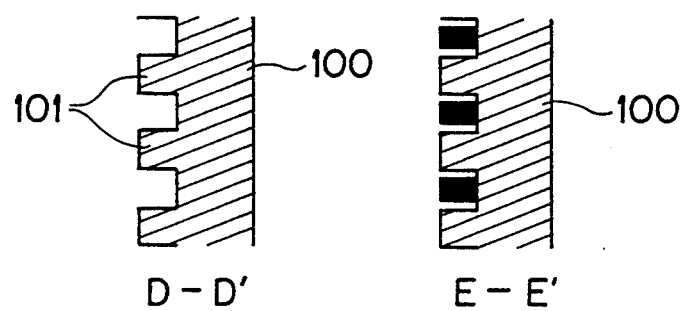

The length of the prepit PP in the direction of the normal line, is formed generally longer than the information pit 101 (which is indicated by a circle mark in FIG. 6A) as shown in FIG. 6A. The width of the prepit PP in the radial direction is almost equal to or less than the width of the land L, as shown in FIGS. 6A and 6C.

The searching operation for the target address in this second embodiment, is similar to that of the first embodiment, and it is sufficiently explained just by interchanging the land L and groove G in the explanation of the first embodiment.

Even in the case that there are intermingled the information pits, which are reproducible by the super resolution reproduction, and the address pits, which are only reproducible by the normal reproduction, the reproduction is not influenced by the crosstalk etc., the record data can be perfectly reproducible, and the recording density of the magneto-optical disk can be also improved according to the second embodiment, as in the case of the first embodiment.

Third Embodiment

FIG. 7 shows a constitution of the optical disk of the third embodiment. The prepits PP are formed in the third embodiment such that the central axis of each prepit PP is located between the central axis of the groove and the central axis of the land.

Figure 7A:
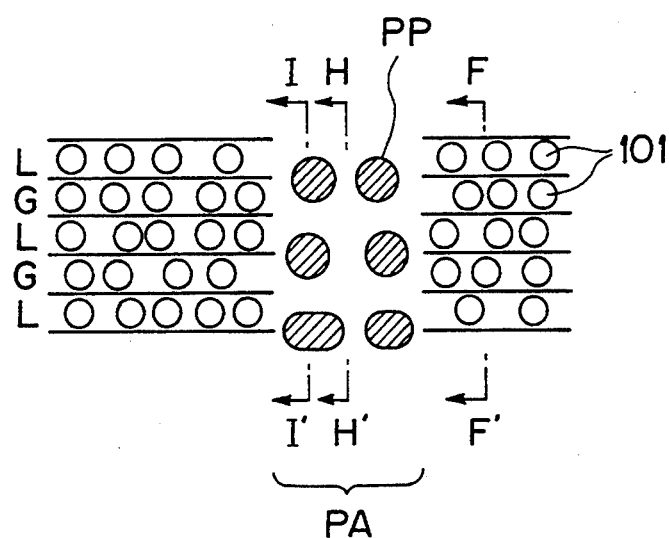
FIG. 7, which consist of FIGS. 7A to 7D, are diagrams for explaining a constitution of an optical disk of a third embodiment.
Figures 7B, 7C, 7D:
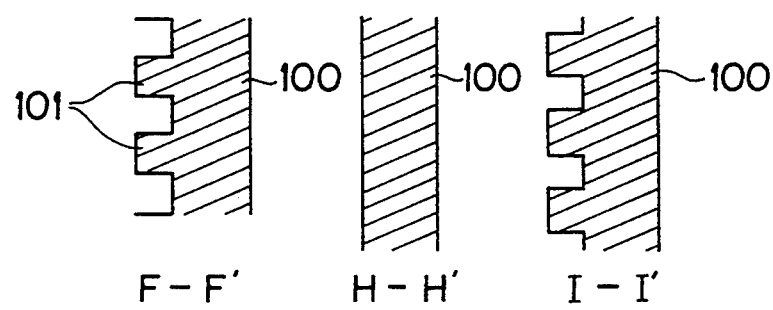

As shown in FIG. 7A, a plurality of lands L and a plurality of grooves G are prepared on a recording surface of a substrate of the magneto-optical disk. As shown in FIG. 7B, the F-F' cross section is made in the concavo-convex state on a substrate 100 of the optical disk.

The prepits (which are indicated by a slash circle mark in FIG. 7A) are formed such that the axis of the prepit PP (i.e. the phase pit) for address generation, is located between the axis of the groove G and the axis of the land L of the magneto-optical disk. In the present embodiment, the area PA (i.e. the prepit area) in which the prepits are formed, consists of the mirror finished surface as shown in FIG. 7C (the H-H' cross section).

The length of the prepit pit in the direction of the normal line is generally formed longer than the information pit 101 (which is indicated by a circle mark in FIG. 7A). The width of the prepit in the radial direction is almost equal to or less than the sum of the width of the groove G and the width of the land L as shown in FIGS. 7A and 7D.

Nextly, the operation of the present embodiment will be explained with reference to the flow chart of FIG. 8.

In the following explanation, in the similar manner as the first embodiment, it is assumed that whether the position to reproduce/record the information pit is on the land L or on the groove G is indicated by the least significant bit of the address data, and that the target basic address data is recorded as a prepit between the axis of the groove G and the axis of the land L. Since the groove G or the land L exists in the inner circumferential side and the outer circumferential side of this prepit, the target groove G or land L is uniquely determined. Thus, it is not necessary to determine beforehand jumping to the inner circumferential side or jumping to the outer circumferential side according to the basic address data, as in the first embodiment. By monitoring whether the tracking error signal is deflected to the plus (+) side or to the minus (−) side, it becomes possible to perform jumping immediately to the right land or groove.

Figure 8:
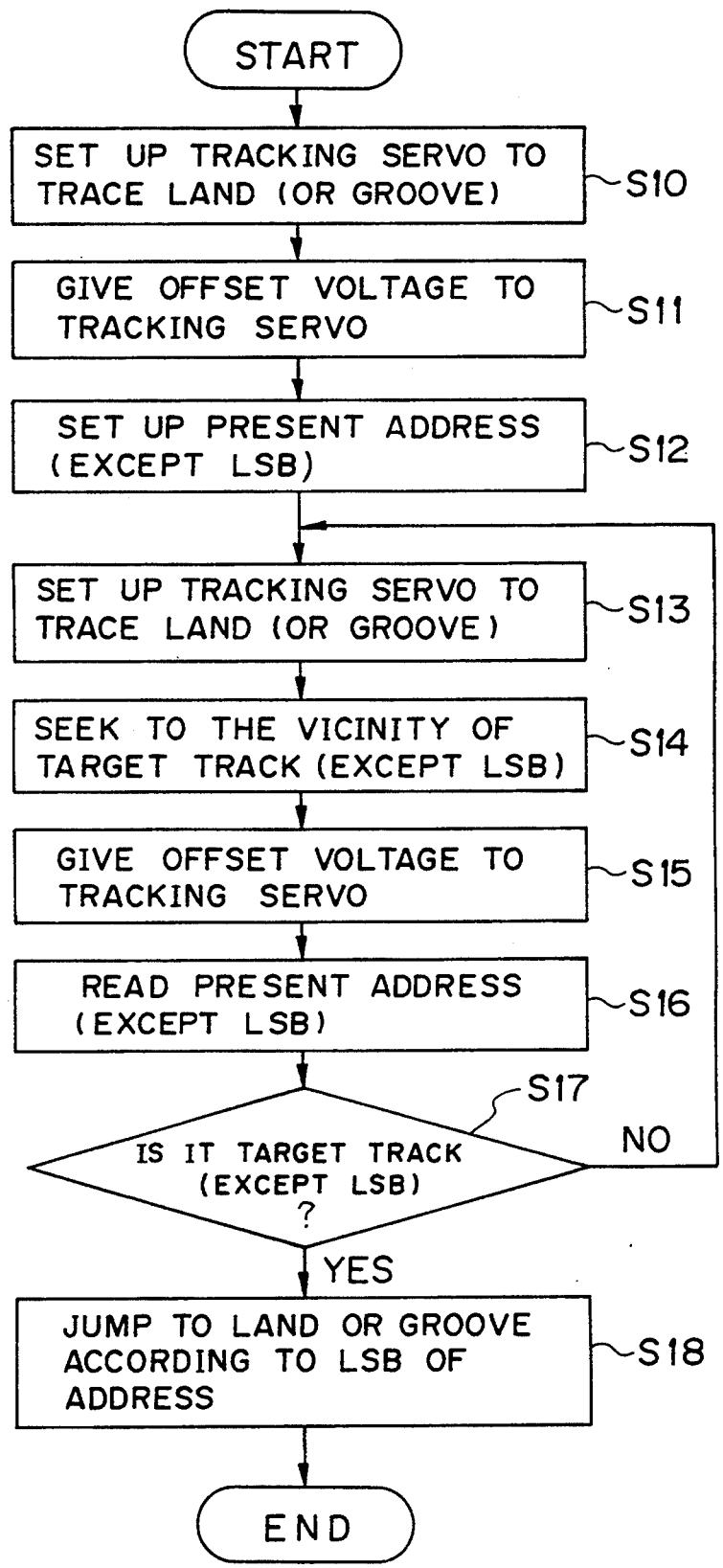
FIG. 8 is a flow chart in the operation of the third embodiment.

In FIG. 8, firstly, the system controller 10 controls the tracking-servo circuit 5 to set up so as to trace the groove G or the land L (step S10). In this third embodiment, this set-up can be performed whether it is the groove G or the land L.

Nextly, the system controller 10 controls the tracking-servo circuit 5 to give, to the pickup 2b, the offset voltage having such a voltage to move the read beam to a position between the axis of the groove G and the axis of the land L (step S11). As the result, the read beam is moved to be at the position between the axis of the groove G and the axis of the land L, so that it becomes possible to read out the signal corresponding to the prepit.

Nextly, the system controller 10 reads the present address data (i.e. the basic address data) obtained through the pickup 2b, the head amplifier 7, the RF amplifier 8, and the EFM decoder 13, by irradiating the light spot onto the prepit (step S12). And, the system controller 10 compares thus obtained data with the portion of the target address data except the least significant bit thereof. The system controller 10 controls the tracking-servo circuit 5 again to set up so as to trace the groove G or the land L (step S13). Then, seeking to the vicinity of the target track (i.e. one set of the land and groove) is performed (step S14).

Nextly, the system controller 10 controls the tracking-servo circuit 5 again to give, to the pickup 2b, the offset voltage having such a voltage to move the read beam to the position between the axis of the groove G and the axis of the land L (step S15). Thus, the read beam is moved to be at the position between the axis of the groove G and the axis of the land L, so that the signal corresponding to the prepit can be read out. Then, the system controller 10 reads the present address data (i.e. the basic address data) obtained through the pickup 2b, the head amplifier 7, the RF amplifier 8, and the EFM decoder 13 (step S16). The system controller 10 compares thus obtained data with the portion of the target address data except the least significant bit thereof, and judges whether it has reached to the target track or not (step S17).

If it reaches the target track (YES), the system controller 10 judges the least significant bit (=X) of the address data, judges whether the final target address data corresponds to the groove or not, and performs jumping to the groove G or the land L according to the least significant bit of the address (step S18).

After that, the super resolution reproducing operation of the information pit recorded on the groove G or the land L is performed under the control of the system controller 10.

On the other hand, if it does not reach the target track at the step S17 (NO), the processes of the steps S13 to S17 are repeated until it reaches the target track (YES).

As described above in detail, even in the case that there are intermingled the information pits, which are reproducible by the super resolution reproduction, and the address pits, which are only reproducible by the normal reproduction, the reproduction is not influenced by the crosstalk etc., the record data can be perfectly reproduced, and the recording density of the magneto-optical disk can be improved, according to the third embodiment, as in the first and second embodiments.

Moreover, the land L and the group G are formed on the optical disk in the above embodiments. However, the present invention can be adapted to the optical disk on which the land L and the group G are not formed.

As described above in detail, according to one aspect of the present invention, since the information pits, reproducible by the super resolution reproduction, are recorded on a plurality of the record tracks, and since one address pit for address reproduction is formed with respect to one set of the recording tracks adjacent to each other in the radial direction of the optical disk, the information recording density can be improved. Further, even in the case that the size of the address pit is not small but is large as compared with the information pit, the recording operation in which the recording density is improved, becomes possible.

According to another aspect of the present invention, since one address pit for address reproduction is formed with respect to one set of the land and the groove adjacent to each other in the radial direction of the optical disk, the information recording density can be improved. Further, even in the case that the size of the address pit is not small but is large, the recording operation in which the recording density is improved, becomes possible.

According to another aspect of the present invention, since only one address pit is recorded with respect to one set of the land and the groove, the information pit on the desired land or the desired groove can be reproduced. Further, even in the case that the size of the address pit is not be small, the reproduction of the optical disk in which the recording density is improved, becomes possible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disk, to be reproduced by forming a light spot with a predetermined diameter thereon, comprising:
   a substrate shaped in a magneto-optical disk, and having a recording surface;
   a plurality of recording tracks formed substantially coaxially on the recording surface;
   a plurality of information pits, which are recorded on said plurality of recording tracks as magnetization directions at said recording surface in a magneto-optical recording operation and are arranged with such a high pit density as to be non-reproducible by a normal resolution reproduction by use of the light spot but reproducible by a super resolution reproduction by use of the light spot; and
   an address pit for address reproduction formed in advance to the recording operation on the recording surface with respect to one set of recording tracks adjacent to each other in a radial direction of the optical disk, having a convex or concave shape on the recording surface and being arranged with such a low pit density as to be reproducible by a normal resolution reproduction by use of the light spot.

2. An optical disk as set forth in claim 1, wherein said address pit is larger than said information pit in the radial direction of said optical disc.

3. An optical disk, to be reproduced by forming a light spot with a predetermined diameter thereon, comprising:
   a substrate shaped in a magneto-optical disk, and having a recording surface;
   a recording track including a plurality of lands and a plurality of grooves, and formed substantially coaxially on the recording surface;
   a plurality of information pits, which are recorded on both of the land and the groove as magnetization directions at said recording surface in a magneto-optical recording operation and are arranged with such a high pit density as to be non-reproducible by a normal resolution reproduction by use of the light spot but reproducible by a super resolution reproduction by use of the light spot; and
   an address pit for address reproduction formed in advance to the recording operation on the recording surface with respect to one set of the land and the groove adjacent to each other in a radial direction of the optical disk, having a convex or concave shape on the recording surface and being arranged with such a low pit density as to be reproducible by a normal resolution reproduction by use of the light spot.

4. An optical disk as set forth in claim 3, wherein said address pit is formed on said groove.

5. An optical disk as set forth in claim 3, wherein said address pit is formed on said land.

6. An optical disk as set forth in claim 3, wherein said address pit is formed such that the central axis of said address pit is positioned between the central axis of the groove and the central axis of the land.

7. An optical disk as set forth in claim 3, wherein said address pit is larger than said information pit in the radial direction of said optical disc.

8. An optical disk reproducing apparatus for reproducing an optical disk, to be reproduced by forming a light spot with a predetermined diameter thereon, comprising:
   a substrate shaped in a magneto-optical disk, and having a recording surface; a recording track including a plurality of lands and a plurality of grooves, and formed substantially coaxially on the recording surface; a plurality of information pits, which are recorded on both of the land and the groove as magnetization directions at said recording surface in a magneto-optical recording operation and are arranged with such a high pit density as to be non-reproducible by a normal resolution reproduction by use of the light spot but reproducible by a super resolution reproduction by use of the light spot; and an address pit for address reproduction formed in advance to the recording operation on the recording surface with respect to one set of the land and the groove adjacent to each other in a radial direction of the optical disk, having a convex or concave shape on the recording surface and being arranged with such a low pit density as to be reproducible by a normal resolution reproduction by use of the light spot, said apparatus comprising:
   an optical pickup for irradiating a read beam onto said optical disk to form the light spot with the predetermined diameter and reading information recorded on said optical disk;
   a first driving means for searching the address pit corresponding to a desired land or groove by driving the optical pickup, and for driving the read beam to a recording position of the address pit when reproducing the information pit on the desired land or groove; and
   a second driving means for driving the read beam to the desired land or groove from the recording position of the address pit.

9. An optical disk reproducing apparatus as set forth in claim 8, wherein said address pit is formed on said groove.

10. An optical disk reproducing apparatus as set forth in claim 8, wherein said address pit is formed on said land.

* * * * *